US010523754B2

(12) United States Patent
Tenzer et al.

(10) Patent No.: US 10,523,754 B2
(45) Date of Patent: Dec. 31, 2019

(54) METHODS FOR INTEGRATING APPLICATIONS WITH A DATA STORAGE NETWORK AND DEVICES THEREOF

(71) Applicant: NetApp, Inc., Sunnyvale, CA (US)

(72) Inventors: Keith Tenzer, Munich (DE); Charles M. Fouts, Apex, NC (US); Clemens Siebler, Munich (DE)

(73) Assignee: NETAPP, INC., Sunnyvale, CA (US)

( * ) Notice: Subject to any disclaimer, the term of this patent is extended or adjusted under 35 U.S.C. 154(b) by 493 days.

(21) Appl. No.: 14/553,344

(22) Filed: Nov. 25, 2014

(65) Prior Publication Data

US 2016/0150015 A1    May 26, 2016

(51) Int. Cl.
*H04L 29/08* (2006.01)
*H04L 12/24* (2006.01)

(52) U.S. Cl.
CPC ...... *H04L 67/1097* (2013.01); *H04L 41/0803* (2013.01); *H04L 67/1095* (2013.01)

(58) Field of Classification Search
CPC ............. G06F 2201/84; G06F 11/1448; G06F 17/30088; G06F 9/45558; G06F 11/1469; G06F 11/1458; G06F 3/065; G06F 11/1402; H04L 67/1095; H04L 67/1097; H04L 41/0803
USPC .......... 707/649, 999.202, 999.204, 639, 640, 707/679; 709/223, 238
See application file for complete search history.

(56) References Cited

U.S. PATENT DOCUMENTS

| 6,308,178 | B1 * | 10/2001 | Chang | G06F 16/258 |
| 6,691,138 | B1 * | 2/2004 | Kirkpatrick | G06F 16/10 713/1 |
| 7,366,742 | B1 * | 4/2008 | Umbehocker | G06F 11/1435 |
| 7,437,388 | B1 * | 10/2008 | DeVos | G06F 11/1464 |
| 8,046,550 | B2 * | 10/2011 | Feathergill | G06F 11/1466 711/162 |
| 8,056,076 | B1 * | 11/2011 | Hutchins | G06F 9/461 707/639 |
| 2004/0255005 | A1 * | 12/2004 | Spooner | G06F 16/258 709/218 |

(Continued)

OTHER PUBLICATIONS

"Quiescing a Database", Oracle Database Administrator's Guide, May 2013.*

(Continued)

*Primary Examiner* — Tonia L Dollinger
*Assistant Examiner* — Jonathan A Sparks
(74) *Attorney, Agent, or Firm* — Klein, O'Neill & Singh, LLP

(57) ABSTRACT

A method, non-transitory computer readable medium, and application server computing device that receives a request identifying an operation to be performed on an application and a plugin associated with the application. The operation corresponds to an application task in a workflow for a data storage network action. An operating system call is generated to execute the plugin, wherein the call comprises at least one argument that identifies the operation. A standard-out output is obtained from the plugin, wherein the output comprises at least an indication of a status of the operation. The output is parsed, a result object is generated based on the parsed output, and the result object is returned in response to the received request. The result object includes at least the indication of the status of the operation.

20 Claims, 6 Drawing Sheets

(56) References Cited

U.S. PATENT DOCUMENTS

| | | | |
|---|---|---|---|
| 2008/0028009 A1* | 1/2008 | Ngo | G06F 11/2097 |
| 2008/0034016 A1* | 2/2008 | Cisler | G06F 11/1466 |
| 2008/0059656 A1* | 3/2008 | Saliba | H04L 67/1095 |
| | | | 709/248 |
| 2009/0216816 A1* | 8/2009 | Basler | G06F 11/1464 |
| 2009/0235282 A1* | 9/2009 | Meijer | G06F 9/547 |
| | | | 719/320 |
| 2012/0084261 A1* | 4/2012 | Parab | G06F 11/1453 |
| | | | 707/654 |
| 2012/0198457 A1* | 8/2012 | Leonelli | G06Q 10/06 |
| | | | 718/102 |
| 2014/0047040 A1* | 2/2014 | Patiejunas | H04L 51/24 |
| | | | 709/206 |
| 2014/0075032 A1* | 3/2014 | Vasudevan | G06F 9/5072 |
| | | | 709/226 |
| 2016/0119289 A1* | 4/2016 | Jain | H04L 63/0281 |
| | | | 726/12 |

OTHER PUBLICATIONS

"Describe Syntax", MySQL Reference Manual, Oracle, May 2013.*
Clouds OnCommand "Snap Creator 4.1 Available Now!" Clouds OnCommand: Data Storage Management for Clouds, Jan. 23, 2014.

* cited by examiner

```
if ($args.length -ne 1) {
    write-warning "You must specify a method";
    break;
} function log ($level, $message) {
    $d = get-date
    echo "SC_MSG#$level#$d#$message"
} function describe {
    echo "SC_DESCRIBE#OP#quiesce"
    echo "SC_DESCRIBE#OP#unquiesce"
    echo "SC_DESCRIBE#OP#discover"
    echo "SC_DESCRIBE#DESCRIPTION#plugin windows example"
    echo "SC_DESCRIBE#PARAMETER#PARAM1#a parameter description, mandatory parameter#PARAM1=value#Y"
    echo "SC_DESCRIBE#PARAMETER#PARAM2#a parameter description, optional parameter#PARAM2=value#N"
    echo "SC_DESCRIBE#PARAMETER#PARAM3#a parameter description, optional parameter#PARAM3=value"
    echo "describe completed successfully"
    exit 0
} function quiesce {
    $app_name = (get-item env:APP_NAME).value
    log "INFO" "Quiescing application using script $app_name";

log "INFO" "Quiescing application finished successfully"
} function unquiesce {
    $app_name = (get-item env:APP_NAME).value
    log "INFO" "Unquiescing application using script $app_name";

log "INFO" "Unquiescing application finished successfully"
} function discover {
    $app_name = (get-item env:APP_NAME).value
    log "INFO" "Discovering application using script $app_name"
    echo "SC_DISCOVER#DATA#DISCOVERED#sapfiler2-gig#scriptdb_sapdata1_SCRIPT"
    echo "SC_DISCOVER#DATA#DISCOVERED#sapfiler2-gig#scriptdb_sapdata2_SCRIPT"
    echo "SC_DISCOVER#DATA#DISCOVERED#sapfiler2-gig#scriptdb_sapdata3_SCRIPT"
    echo "SC_DISCOVER#DATA#RESULT#0"
    echo "SC_DISCOVER#ONLINE_LOG#DISCOVERED#sapfiler2-gig#scriptdb_saplog_SCRIPT"
    echo "SC_DISCOVER#ONLINE_LOG#FAILED#/this/is/my/filesystem"
    echo "SC_DISCOVER#ONLINE_LOG#RESULT#1"
    echo "SC_DISCOVER#ENV#MY_ENV_1#hello world"
    echo "SC_DISCOVER#ENV#MY_ENV_2#blah blah"
    echo "SC_DISCOVER#ENV#MY_ENV_3#foo, bar"
    log "INFO" "Discovering application using script $app_name finished successfully"
    exit 0
} switch ($args[0]) {
    "-describe" {
        describe;
    }
    "-quiesce" {
        quiesce;
    }
    "-unquiesce" {
        unquiesce;
    }
    "-discover" {
        discover;
    } default {
        write-error "unknown operation $args";
        exit-pssession 1;
    }
} exit 0;
```

METHODS FOR INTEGRATING APPLICATIONS WITH A DATA STORAGE NETWORK AND DEVICES THEREOF

FIELD

This technology generally relates to integrating applications with a data storage network and, more particularly, to methods and devices for facilitating communication with applications in a language-agnostic manner in order to implement generic or common workflows corresponding to data storage network actions.

BACKGROUND

Data storage networks generally facilitate actions such as backing-up, restoring, or cloning data associated with applications or databases executed on application servers. In order to enable such data storage network actions, communication between the applications and storage servers of the data storage network must be facilitated. For example, a backup host server may need to instruct an application executing on an application server to quiesce and unquiesce, among other instructions, as part of implementing a backup of the application data to storage servers managed by the backup host server.

However, these applications can be physical or virtual and are often executed in many different operating environments and/or hypervisors supported by the host application servers. In particular, cloud service providers often need to backup, or perform other data storage network actions on, applications or databases located on host application servers and running in a hypervisor. Additionally, the applications each may support a different programming language and provide different tools, application programming interface (API) protocols, and/or capabilities.

Accordingly, performing data storage network actions on applications or databases often requires making use of many programming languages across many host operating environments in order to implement application tasks. However, inter-communication between different programming languages is very limited and may not be possible in some implementations, resulting in a significant barrier to the integration of applications with data storage networks.

SUMMARY

A method for interfacing with application plugins to facilitate data storage network actions includes receiving, by an application server computing device, a request identifying an operation to be performed on an application and a plugin associated with the application. The operation corresponds to an application task in a workflow for a data storage network action. An operating system call is generated, by the application server computing device, to execute the plugin, wherein the call comprises at least one argument that identifies the operation. A standard-out output is obtained, by the application server computing device, from the plugin, wherein the output comprises at least an indication of a status of the operation. The output is parsed, by the application server computing device, a result object is generated, by the application server computing device, based on the parsed output, and the result object is returned, by the application server computing device, in response to the received request. The result object includes at least the indication of the status of the operation.

A non-transitory computer readable medium having stored thereon instructions for interfacing with application plugins to facilitate data storage network actions comprising executable code which when executed by a processor, causes the processor to perform steps including receiving a request identifying an operation to be performed on an application and a plugin associated with the application. The operation corresponds to an application task in a workflow for a data storage network action. An operating system call is generated to execute the plugin, wherein the call comprises at least one argument that identifies the operation. A standard-out output is obtained from the plugin, wherein the output comprises at least an indication of a status of the operation. The output is parsed, a result object is generated based on the parsed output, and the result object is returned in response to the received request. The result object includes at least the indication of the status of the operation.

An application server computing device including a processor and a memory coupled to the processor which is configured to be capable of executing programmed instructions comprising and stored in the memory to receive a request identifying an operation to be performed on an application and a plugin associated with the application. The operation corresponds to an application task in a workflow for a data storage network action. An operating system call is generated to execute the plugin, wherein the call comprises at least one argument that identifies the operation. A standard-out output is obtained from the plugin, wherein the output comprises at least an indication of a status of the operation. The output is parsed, a result object is generated based on the parsed output, and the result object is returned in response to the received request. The result object includes at least the indication of the status of the operation.

This technology provides a number of advantages including methods, non-transitory computer readable media, and devices that more efficiently and effectively facilitate integration of applications with data storage networks. With this technology, a backup host server of a storage network communicates with an agent executing on an application server. The agent executes and communicates with plugins, each of which is associated with one of the various applications hosted by the application server.

While the agent may be written in one programming language (e.g., java) that is different from that of one or more of the applications and associated plugins, the agent communicates with the plugins using a predefined, uniform set of operations and standard-in and standard-out data exchange methods implemented by all programming languages. Accordingly, the plugins advantageously abstract the application capabilities, thereby allowing the backup host server to communicate with the applications irrespective of programming language.

BRIEF DESCRIPTION OF THE DRAWINGS

FIG. 6 is a fragment of an exemplary Windows PowerShell plugin.

DETAILED DESCRIPTION

Figure 1:
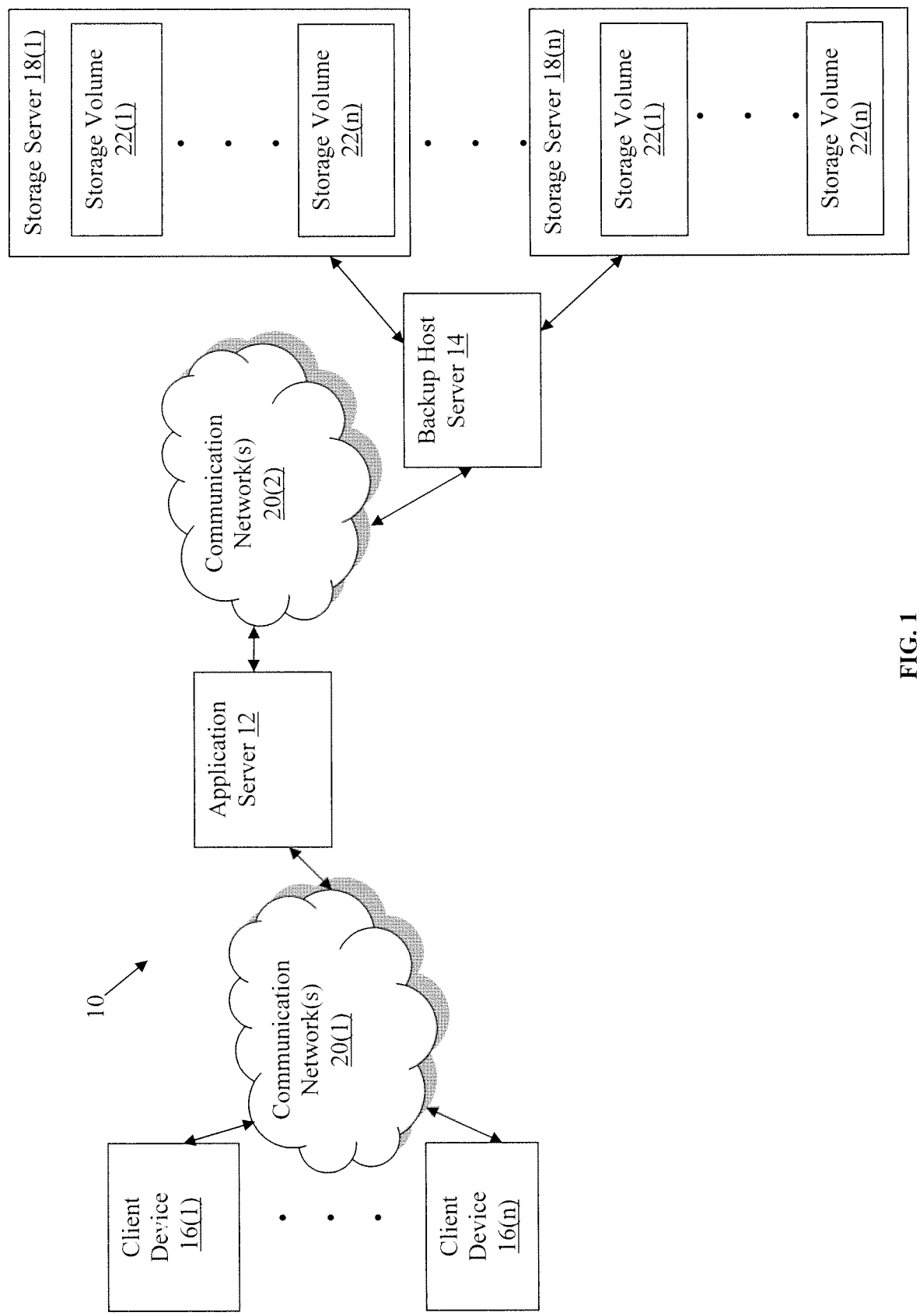
FIG. 1 is a block diagram of a network environment which incorporates an exemplary application server and data storage network with storage host sever and storage servers.

A network environment 10 with an exemplary application server 12 and an exemplary backup host server 14 is illustrated in FIG. 1. The exemplary environment 10 further includes client devices 16(*l*)-16(*n*) and storage servers 18(1)-18(*n*), although this environment 10 can include other numbers and types of systems, devices, components, and/or elements in other configurations. The client devices 14(1)-14(*n*) are in communication with the application server 12 through communication network(s) 20(1) and the application server 12 is in communication with the backup host server 14 through communication network(s) 20(2). The communication network(s) 20(1) and 20(2) can be local area networks (LANs), wide area networks (WANs), or a combination thereof, for example. This technology provides a number of advantages including methods, non-transitory computer readable media, and devices that more effectively integrate applications with a data storage network.

Each of the client devices 16(1)-16(*n*) in this example can include a processor, a memory, a communication interface, an input device, and a display device, which are coupled together by a bus or other communication link, although each of the client devices 16(1)-16(*n*) can have other types and numbers of components. The client devices 16(1)-16(*n*) may run interface applications that provide an interface to exchange data with applications hosted by the application server 12, for example. Each of the client devices 16(1)-16(*n*) may be, for example, a conventional personal computer (PC), a workstation, a smart phone, or other processing and/or computing system.

The storage servers 18(1)-18(*n*) in this example receive and respond to various read and write requests from the backup host server 14, such as requests to write or store data as a backup to application data associated with applications hosted by the application server 12, for example, as described and illustrated in more detail later. Each of the storage servers 18(1)-18(*n*) can include a processor, a memory, and a communication interface, which are coupled together by a bus or other communication link, although each of the storage servers 18(1)-18(*n*) can have other types and numbers of components.

The memory in each of the storage servers 18(1)-18(*n*) can include conventional magnetic or optical disks, or any other type of non-volatile persistent storage suitable for storing large quantities of data. In this example, at least a portion of the memory of each of the storage server 18(1)-18(*n*) is organized into a plurality of storage volumes 22(1)-22(*n*), which can optionally span any number of the storage servers 18(1)-18(*n*). Optionally, each of the storage servers 18(1)-18(*n*) can be a primary or a secondary backup server and/or can represent multiple storage servers in a storage server array, for example.

Figure 2:
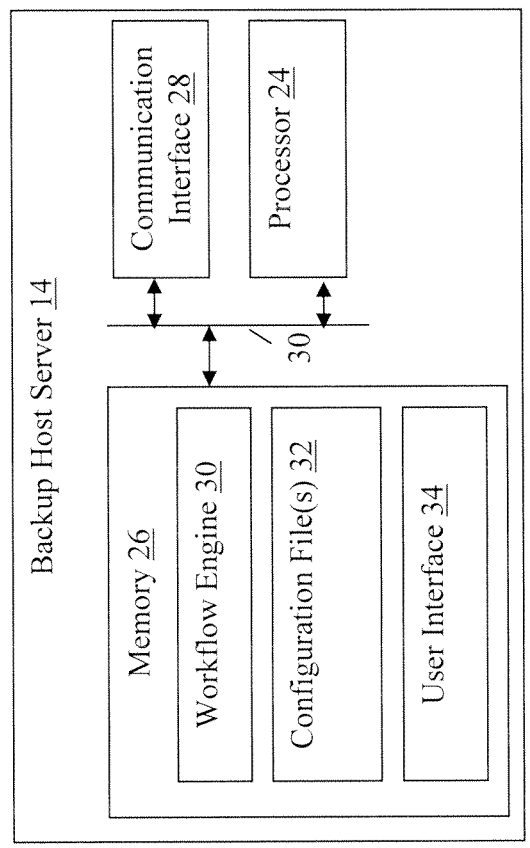
FIG. 2 a block diagram of the exemplary backup host server.

Referring to FIG. 2, a block diagram of the exemplary backup host server 14 is illustrated. The backup host server 14 manages the storage servers 18(1)-18(*n*) and implements data storage network actions such as backing up, restoring, or cloning, for example, on behalf of applications executing on the application server 12. Optionally, the backup host server 14 can communicate with the storage servers 18(1)-18(*n*) over a communication network (not shown) using an NFS or CIFS protocol, for example, although other types of connections and communication methods can also be used. The backup host server 14 in this example includes a processor 24, a memory 26, and a communication interface 28 coupled together by a bus 30 or other communication link, although other numbers and types of devices can also be used.

The processor 24 in the backup host server 14 executes a program of stored instructions one or more aspects of the present invention, as described and illustrated by way of the embodiments herein, although the processor 24 could execute other numbers and types of programmed instructions. The processor 24 in the backup host server 12 may include one or more central processing units or general purpose processors with one or more processing cores, for example.

The memory 26 in the backup host server 14 stores these programmed instructions for one or more aspects of the present invention, as described and illustrated herein, although some or all of the programmed instructions can be stored and/or executed elsewhere. A variety of different types of memory storage devices including random access memory (RAM), read only memory (ROM), hard disk drives, solid state storage drives, or other computer readable media which is read from and/or written to by a magnetic, optical, or other reading and/or writing system that is coupled to the processor 24 can be used for the memory 26 in the backup host server 14.

In this example, the memory 26 includes a workflow engine 30, configuration file(s) 32, and a user interface 34, although the memory 26 could also include other interfaces, an operating system, and/or other types and numbers of applications or modules. The workflow engine 30 carries out workflows, which may be encapsulated in XML files, for example. The workflows are each a set of tasks including application and storage tasks to be performed in order carry out data storage network actions, as described and illustrated in more detail later. The application tasks correspond with operations to be performed on applications hosted by the application server 12. The storage tasks correspond with operations to be performed on one or more of the volumes 22(1)-22(*n*) hosted by one or more of the storage servers 18(1)-18(*n*).

The workflows are executed by the workflow engine 30 which utilizes the configuration file(s) 32. The configuration file(s) 32 are each associated with an application hosted by the application server 12 and each includes a set of parameters corresponding to key/value pairs which define the options to be followed when performing a workflow on an application. At least some of the options can be enabled or disabled through the key/value pairs and exemplary parameters can relate to error handling, whether predefined workflows will not be used for certain actions, and which plugin is to be used, for example, although any other parameters can also be used in the configurations file(s) 32. The configuration file(s) 32 can be stored by an administrator and can optionally be changed dynamically.

The user interface 34 facilitates interaction with the backup host server 14, such as to instruct the backup host server 14 to perform a data storage network action with respect to an application hosted by the application server 12. The user interface 34 can be a graphical user interface or a command line interface, for example. Alternatively, the user interface 34 can represent an application programming interface (API) made available to third party solutions configured to initiate data storage network actions, although other types of user interfaces 34 can be provided and the actions can be initiated in other manners.

Figure 3:
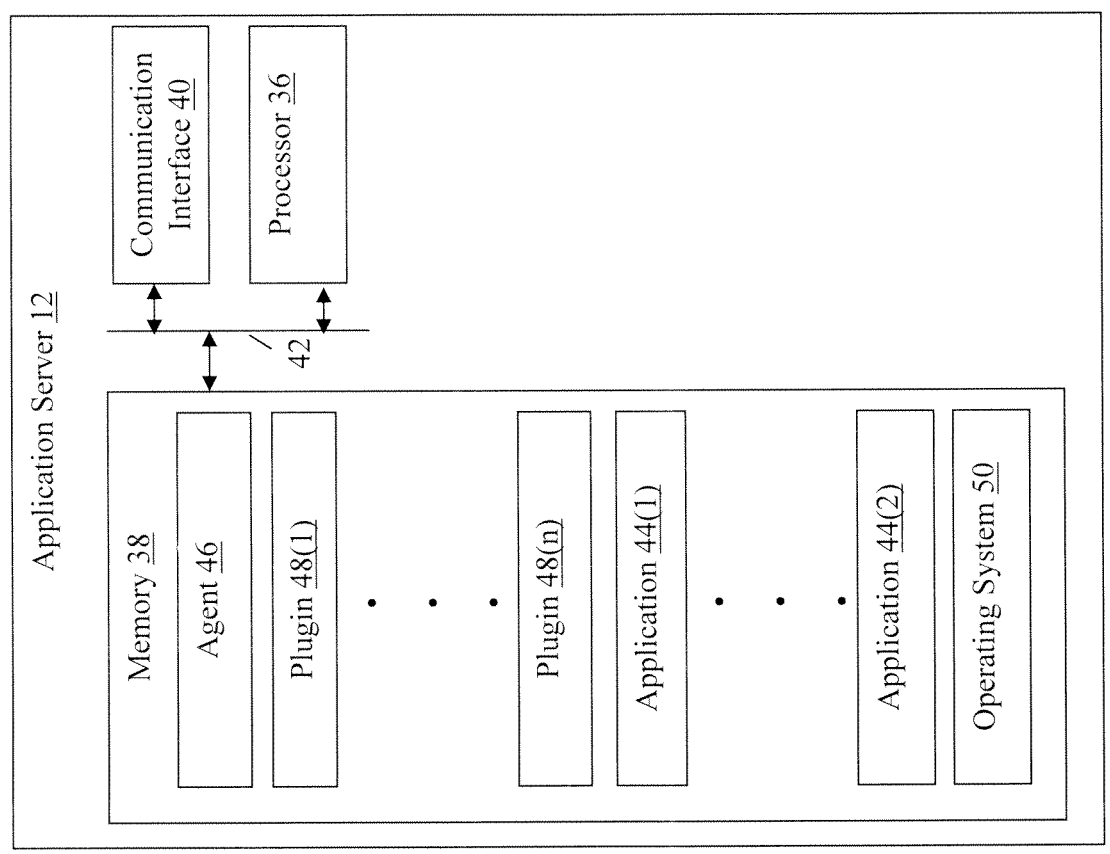
FIG. 3 a block diagram of the exemplary application server.

Referring to FIG. 3, a block diagram of the exemplary application server 12 is illustrated. The application server 12 can host applications that can be utilized by the client devices 16(1)-16(n) and which can utilize the data storage network, including the storage host sever 14 and the storage servers 18(1)-18(n), to facilitate data storage network actions. In this example, the application server 12 includes a processor 36, a memory 38, and a communication interface 40 coupled together by a bus 42 or other communication link, although other numbers and types of devices can also be used.

The processor 36 in the application server 12 executes a program of stored instructions one or more aspects of the present invention, as described and illustrated by way of the embodiments herein, although the processor 36 could execute other numbers and types of programmed instructions. The processor 36 in the application server 12 may include one or more central processing units or general purpose processors with one or more processing cores, for example.

The memory 38 in the application server 12 stores these programmed instructions for one or more aspects of the present invention, as described and illustrated herein, although some or all of the programmed instructions can be stored and/or executed elsewhere. A variety of different types of memory storage devices including random access memory (RAM), read only memory (ROM), hard disk drives, solid state storage drives, or other computer readable media which is read from and/or written to by a magnetic, optical, or other reading and/or writing system that is coupled to the processor 36 can be used for the memory 38 in the application server 12.

In this example, the memory 38 includes applications 44(1)-44(n), an agent 46, plugins 48(1)-48(n) and an operating system 50, although in other examples the memory can also include hypervisor(s) and/or various other programs and/or modules. The applications 44(1)-44(n) can be any type of application or database (collectively referred to herein as applications) that can be utilized by the client devices 16(1)-16(n) and which utilize a data storage network, including the backup host server 14 and storage servers 18(1)-18(n), for various storage services and data storage network actions, such as backing-up and restoring data, for example.

The agent 46 in this example interfaces with the backup host server 14 to receive requests identifying tasks to be performed on the applications 44(1)-44(n), the tasks associated with a workflow corresponding to a data storage network action. The agent 46 also communicates with the operating system 50 to initiate execution of the plugins 36(1)-36(n) that execute the operations, as described and illustrated in more detail later. Accordingly, the agent is a broker or intermediary between the backup host server 14 and the plugins 48(1)-48(n). The agent 46 is a daemon in this example, although the agent 46 can also be another type of program or module and can implement additional functionality.

Each of the plugins 48(1)-48(1) is an application, program, standalone script, binary file, or directly integrated object oriented class, for example, that interfaces with the agent 46 to receive operations and with a respective and corresponding one of the applications 44(1)-44(n) to implement the requested operations. The plugins 48(1)-48(n) implement defined method(s) in a respective programming or scripting language that correspond with the operations. The plugins 48(1)-48(n) are passed one of a predefined set of operations as an argument by the agent 46 upon being called using a standard-in (STDIN) data exchange method. Accordingly, the operations abstract the method(s) implemented by the plugins 48(1)-48(n) in their respective languages.

Additionally, the plugins 48(1)-48(n) return information subsequent to an operation being performed on a corresponding one of the applications 44(1)-44(n) using a standard-out (STDOUT) data exchange method and a predefined, fixed format. By using the standard data exchange methods, the agent 46 and plugins 48(1)-48(n) can advantageously communicate information necessary to carry out operations corresponding to application tasks of a workflow corresponding to data storage network actions in a language-agnostic manner, as described and illustrated in more detail later.

The communication interface 26 in the application server 12 is used to communicate between the client devices 16(1)-16(n) and backup host server 14, which are all coupled together via the communication networks 20(1) and 20(2), although other types and numbers of communication networks or systems with other types and numbers of connections and configurations to other devices and elements can also be used. By way of example only, one or more of the communication networks 20(1) and 20(2) can use TCP/IP over Ethernet and industry-standard protocols, including hypertext transfer protocol (HTTP), and/or secure HTTP (HTTPS), although other types and numbers of communication networks each having their own communications protocols can also be used.

Although examples of the application server 12, backup host server 14, client devices 16(1)-16(n), and storage servers 18(1)-18(n) are described herein, the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 4:
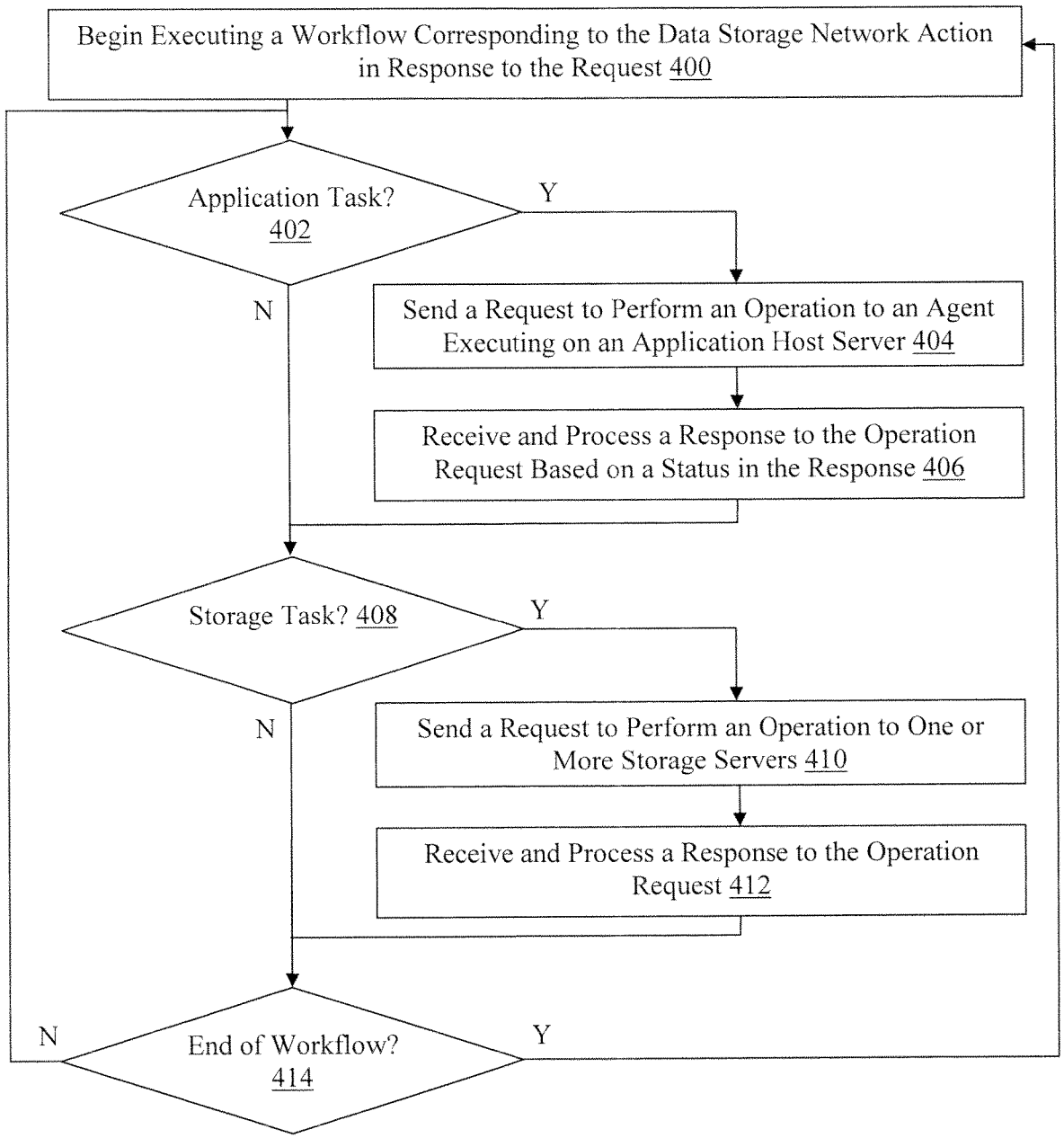
FIG. 4 is a flowchart of an exemplary method for implementing workflows corresponding to data storage network actions with the backup host server.

Referring to FIGS. 1-6, an exemplary method for integrating the applications 44(1)-44(n) hosted by the application server 12 with the data storage network, including the backup host server 14 and storage servers 18(1)-18(n), will now be described. Referring more specifically to FIG. 4, an exemplary method for implementing workflows corresponding to data storage network actions with the backup host server 14 is illustrated. In step 400, the backup host server 14 begins executing a workflow corresponding to a data storage network action. The data storage network action can be a backup, restore, or clone action, for example, although the backup host server 14 can execute workflows corresponding to other data storage network actions.

As part of executing the workflow in step 400, the backup host server 14 can retrieve one of the configuration file(s) 32 associated with the application identified in the request. The workflow can be encapsulated in an XML file, for example, and can include an indication of abstracted tasks required to be performed in order to carry out the action. For example, a backup workflow generally may include tasks such as quiescing the one of the applications 44(1)-44(n) identified in the request, retrieving data to be backed up, storing the retrieved data on one of the storage servers 18(1)-18(n), and unquiescing the one of the applications 44(1)-44(n).

In step 402, the backup host server 14 determines whether an application task is encountered while executing the workflow. In the above example, application tasks can include quiescing and unquiescing, although the application tasks can include any other type of tasks to be performed on the one of the applications 44(1)-44(n) that require communication with the application server 12. If the backup host server 14 determines that an application task is encountered, then the Yes branch is taken to step 404.

In step 404, the backup host server 14 sends a request to perform an operation on the one of the applications 44(1)-44(n) to the agent 46 executing on the application server 12. The operation corresponds with the application task and the request is sent in this example to a representational state transfer (REST) endpoint associated with the agent 46. The REST endpoint is optionally non-public and previously established, although other methods of communicating the request to perform the operation can also be used.

In this example, the request to perform the operation includes an indication of the one of the plugins 48(1)-48(n) associated with the one of the applications 44(1)-44(n). The one of the plugins 48(1)-48(n) can be identified in the one of the configuration file(s) 32 associated with the one of the applications 44(1)-44(n), as previously retrieved in step 400. Additionally, the request can include an indication of the operation to be performed and, optionally, one or more key/value pairs or other parameters included in the one of the configuration file(s) 32. The operation can be one of a predefined minimum set of operations required to be implemented by the plugin or an optional operation. In one example, the required minimum set of operations includes at least a quiesce operation, an unquiesce operation, and a describe operation, although other operations can be included in a required minimum set of operations.

In step 406, the backup host server 14 receives and processes a response to the operation request based on a status included with the response. The status can indicate whether the operation was successful or failed, as well as an action to take in response to a failure, for example. The request is handled, and the response is generated and sent, by the agent 46 executing on the application server 14 as described and illustrated in detail later with reference to FIG. 5. Subsequent to receiving and processing the response to the operation request, or if the backup host server 14 determined in step 402 that an application task is not encountered and the No branch is taken, the backup host server 14 proceeds to step 408.

In step 408, the backup host server 14 determines whether a storage task is encountered. In the above example in which the data storage network action is a backup, the storage task can be storing retrieved data on one of the storage servers 18(1)-18(n), although the storage task can include any other type of task that requires interaction with one or more of the storage servers 18(1)-18(n). If the backup host server 14 determines that a storage task is encountered, then the Yes branch is taken to step 410.

In step 410, the backup host server 14 sends a request to perform an operation to one or more of the storage servers 18(1)-18(n). Generally, the storage servers 18(1)-18(n) are easily integrated with the backup host server 14 and therefore do not have similar interoperability issues as those faced by integrating the applications 44(1)-44(n). Accordingly, in step 412, the backup host server 14 receives and processes a response to the operation request. Subsequent to processing the operation request in step 412, or if the backup host server 14 determined in step 408 that a storage task has not been encountered and the No branch is taken, the backup host server 14 proceeds to step 414.

In step 414, the backup host server 14 determines whether the workflow has finished executing. If the backup host server 14 determines that the end of the workflow has not been reached, then the No branch is taken back to step 402 and the backup host server 14 determines whether another application task is encountered. However, if the backup host server 14 determines that the end of the workflow has been reached, then the Yes branch is taken back to step 400 and the backup host server 14 begins executing another workflow as described and illustrated earlier.

Figure 5:
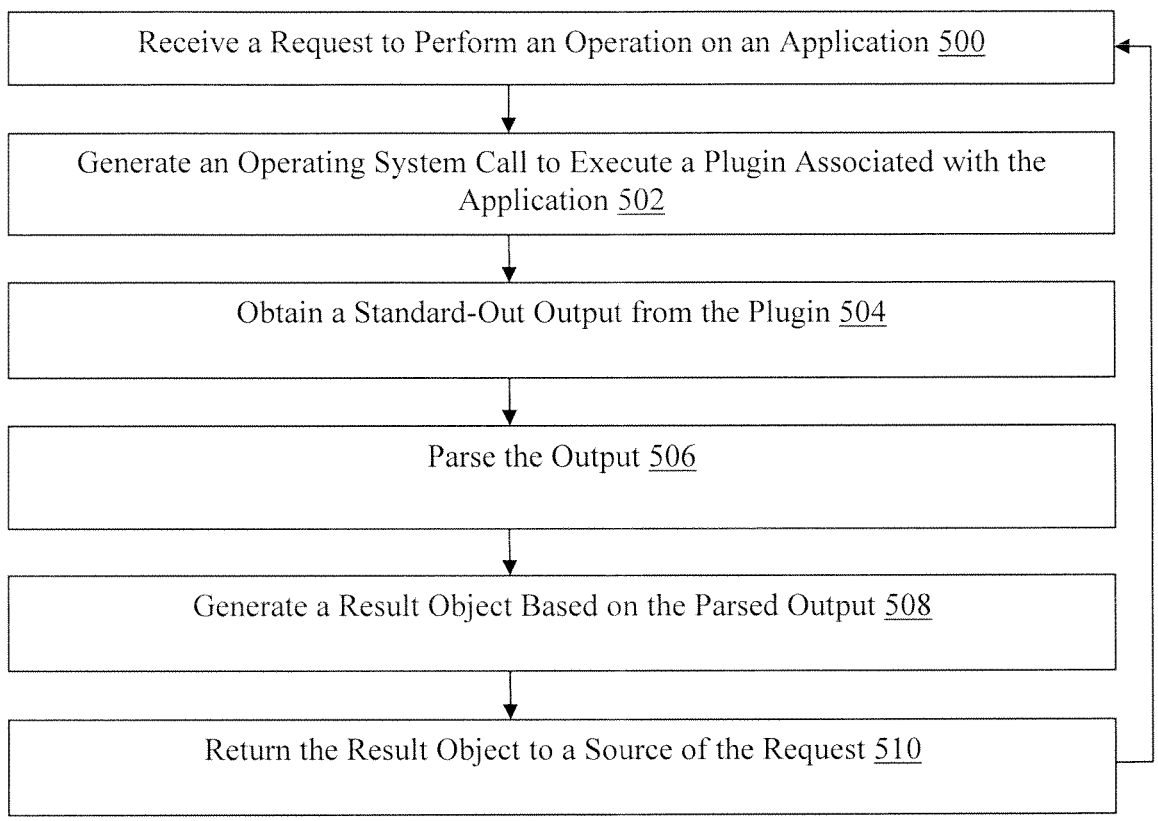
FIG. 5 is a flowchart of an exemplary method for performing operations corresponding to application tasks of a workflow with the application server.

Referring more specifically to FIG. 5, an exemplary method for performing operations corresponding to application tasks of a workflow with the application server 12 is illustrated. In step 500 in this example, the application server 12 receives a request to perform an operation on one of the applications 44(1)-44(n). The request can be sent by the backup host server 14 as described and illustrated earlier with reference to step 406 of FIG. 4. Accordingly, the request can optionally be received by the agent 46 at a REST endpoint. Additionally, the operation can be identified in the request and can correspond to an application task of a data storage network action workflow.

In step 502, the agent 46 executing on the application server 12 generates a call to operating system 50 to execute one of the plugins 48(1)-48(n) associated with the one of the applications 44(1)-44(n). The one of the plugins 48(1)-48(n) can be identified in the request received in step 500. Additionally, the indication of the one of the plugins 48(1)-48(n) can be retrieved from a corresponding one of the configuration file(s) 32, and included in the request, by the backup host server 14, as described and illustrated in more detail earlier. Other methods of communicating an indication of the one of the plugins 48(1)-48(n) associated with the one of the applications 44(1)-44(n) from the backup host server 14 to the agent 46 executing on the application server 12 can also be used.

In one example, the one of the plugins 48(1)-48(n) is named "myplugin" and the identified operation is a quiesce operation. The quiesce operation corresponds with a "quiesce" method implemented by the "myplugin" one of the plugins 48(1)-48(n) in this example, although the corresponding method can have a different name. An indication of the "quiesce" method is passed by the agent 46 as an argument in the invocation of the one of the plugins 48(1)-48(n). Accordingly, the agent 46 in this example could invoke "myplugin-quiesce" through the host operating environment, which in this example is operating system 50. Other operations, method names, and/or formats of invoking the one of the plugins 48(1)-48(n) can be used in other examples. In this example, in response to the invocation, the operating system 50 generates a runtime environment for the one of the plugins 48(1)-48(n) in a new process.

In step 504, the agent 46 executing on the application server 12 obtains a standard-out (STDOUT) output from the one of the plugins 48(1)-48(n). The standard-out output includes result data in a predefined, fixed format that includes common data shared by all plugin methods as well as, optionally, data that is unique to the specific invoked method. Accordingly, in this example, the one of the plugins 48(1)-48(n) implements the "quiesce" method corresponding to the quiesce operation in a programming language associated with the one of the applications 44(1)-44(n), which may be different than the programming language of the agent 46.

However, irrespective of language, the one of the plugins 48(1)-48(n) is preconfigured to output result data via standard-out, which many programming languages are capable of utilizing. Additionally, the output complies with a fixed format or syntax that is expected and interpretable by the agent 46. Since a runtime environment for the one of the plugins 48(1)-48(n) was generated in this example, the standard-out output will be provided to the environment and read via standard-in (STDIN). The output will ultimately be provided to the agent 46 since the agent 46 initiated the call to the operating system 50 that generated the environment and invoked the execution of the one of the plugins 48(1)-48(n) in the environment.

In step 506, the agent 46 executing on the application server 12 parses the output according to the predefined syntax. Accordingly, the agent 46 is configured to parse and interpret the stream of result data output by the one of the plugins 48(1)-48(n). In one example, a portion of the common data shared by all plugin methods can be an indication of a status of the operation. Accordingly, in the above example, the result data output by the one of the plugins 48(1)-48(n) can include an indication of whether the status of the quiesce operation, and in particular whether it was successful or failed.

In this example, the status indication is optionally an exit code having a value of 0, 100, 101, or another number depending on whether the operation was successful, failed, an unquiesce operation should be skipped, and the workflow should be exited, failed and the workflow should continue, or failed, an unquiesce operation should be executed, and the workflow should exit, respectively, for example. Accordingly, the one of the plugins 48(1)-48(n) is configured to output result data that includes the exit code in this example at a predefined location, and in compliance with an established syntax, and the agent 46 is preconfigured to interpret the portion of the output as being an exit code having an established associated meaning or purpose. Other types of information can be included in the output of the one of the plugins 48(1)-48(n), and interpreted by the agent 46 during the parsing, in compliance with the predefined syntax In step 508, the agent 46 executing on the application server 12 generates a result object based on the parsed output. In this example, the agent 46 is written in the java programming language and, accordingly, the result object is an object interpretable by the backup host server 14 using the java programming language, although any other language and type of result object can be used. In step 510, the agent 46 executing on the application server 12 returns the result object to the backup host server 14 in response to the request received in step 500. Accordingly, the backup host server 14 can receive the result object as described and illustrated earlier with reference to step 406 of FIG. 4.

Referring more specifically to FIG. 6, a fragment 600 of an exemplary one of the plugins 48(1)-48(n) written in the Windows PowerShell programming languages is illustrated. In this example, the fragment 600 implements describe, quiesce, unquiesce, and discover methods, although other methods can be implemented by any of the plugins 48(1)-48(n) in other examples. The echo statements in the fragment 600 are configured to write a stream of text to standard-out. Additionally, the indication of a status of the operation associated with the method is an output text stream (e.g., "Quiescing application finished successfully"), although other types of status indications can be used in other examples.

Accordingly, with this technology, developers can write plugins that implement methods that are executed on applications and configured to output result data using standard-out and a predefined syntax. Due to the result data's compliance with the predefined syntax, an agent configured to interface with the data storage network can obtained the result data via standard-in and interpret the result data irrespective of the language of the plugins. Accordingly, operations can be performed on applications to facilitate data storage network actions irrespective of the programming language in which the applications and plugins are written, thereby advantageously facilitating more effective integration of applications with data storage networks.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:

interfacing by an agent with a plurality of plugins, the agent and the plugins executed by a computing device, each plugin corresponding to an application executed by the computing device, each application storing data at a storage system;

wherein the plugins are implemented using plugin specific methods in a plurality of programming languages and communicate with the agent using a standard input and output format, the output format having a common data portion for all the plugins;

identifying from a backup request received by a processor of a server communicating with the computing device and the storage system, a configuration file associated with a first application executed by the computing device, where the backup request is to backup data stored at the storage system on behalf of the first application;

using the configuration file by the processor to identify a first plugin and an application task for the backup request, the configuration file defining a minimum set of operations for the application task implemented by the first plugin;

identifying by the agent the first plugin and the application task from a request transmitted by the processor to the computing device;

generating by the agent, an instruction to execute the first plugin in response to the request from the processor;

upon execution of the application task by the first plugin, indicating a status of the application task in the common data portion of an output generated by the first plugin for the agent;

utilizing the output by the agent for generating a response for the processor in a format different from a format used by the first plugin to generate the output, the response indicating the status to the processor; and executing by the storage system, a storage task for the backup request based on an instruction generated by the processor after receiving the response from the agent.

2. The method of claim 1, wherein the configuration file stores a set of parameters corresponding to key-value pairs that define a plurality of options for the application task.

3. The method of claim 2, wherein one or more of the plurality of options are enabled and disabled using a key-value pair.

4. The method of claim 1, wherein the minimum set of operations include a quiesce and an unquiesce operation.

5. The method of claim 1, wherein the agent parses the output from the first plugin and returns a result object to the processor with the status of the application task via an application programming interface.

6. The method of claim 1, wherein the instruction is an operating system call for an operating system of the computing device that executes a runtime environment for executing the first plugin in a new process.

7. The method of claim 1, wherein in addition to the status in the common data portion, the output from the first plugin includes data that is unique to a specific method executed by the first plugin for the application task.

8. A non-transitory machine readable medium having stored thereon instructions for performing a method, comprising machine executable code which, when executed by one or machines, causing the one or more machines to:
  interface by an agent with a plurality of plugins, the agent and the plugins executed by a computing device, each plugin corresponding to an application executed by the computing device, each application storing data at a storage system;
  wherein the plugins are implemented using plugin specific methods in a plurality of programming languages and communicate with the agent using a standard input and output format, the output format having a common data portion for all the plugins;
  identify from a backup request received by a processor of a server communicating with the computing device and the storage system, a configuration file associated with a first application executed by the computing device, where the backup request is to backup data stored at the storage system on behalf of the first application;
  use the configuration file by the processor to identify a first plugin and an application task for the backup request, the configuration file defining a minimum set of operations for the application task implemented by the first plugin;
  identify by the agent the first plugin and the application task from a request transmitted by the processor to the computing device;
  generate by the agent, an instruction to execute the first plugin in response to the request from the processor;
  upon execution of the application task by the first plugin, indicate a status of the application task in the common data portion of an output generated by the first plugin for the agent;
  utilize the output by the agent for generating a response for the processor in a format different from a format used by the first plugin to generate the output, the response indicating the status to the processor; and
  execute by the storage system, a storage task for the backup request based on an instruction generated by the processor after receiving the response from the agent.

9. The non-transitory machine readable medium of claim 8, wherein the configuration file stores a set of parameters corresponding to key-value pairs that define a plurality of options for the application task.

10. The non-transitory machine readable medium of claim 9, wherein one or more of the plurality of options are enabled and disabled using a key-value pair.

11. The non-transitory machine readable medium of claim 8, wherein the minimum set of operations include a quiesce and an unquiesce operation.

12. The non-transitory machine readable medium of claim 8, wherein the agent parses the output from the first plugin and returns a result object to the processor with the status of the application task via an application programming interface.

13. The non-transitory machine readable medium of claim 8, wherein the instruction is an operating system call for an operating system of the computing device that executes a runtime environment for executing the first plugin in a new process.

14. The non-transitory machine readable medium of claim 8, wherein in addition to the status in the common data portion, the output from the first plugin includes data that is unique to a specific method executed by the first plugin for the application task.

15. A system comprising:
  a memory containing machine readable medium comprising medium executable code and a processor of a backup server coupled to the memory to execute the machine executable code;
  a storage system with a plurality of storage devices for storing data; and
  a computing device executing an agent, a plurality of applications and a plurality of plugins, the agent interfacing with the plurality of plugins, each plugin associated with a corresponding application from among the plurality of applications, and each application storing data at the storage system;
  wherein the plugins are implemented using plugin specific methods in a plurality of programming languages and communicate with the agent using a standard input and output format, the output format having a common data portion for all the plugins;
  wherein the backup server identifies from a backup request, a configuration file associated with a first application from the plurality of application, where the backup request is to backup data stored at the storage system on behalf of the first application;
  wherein the backup server uses the configuration file to identify a first plugin corresponding to the first application and an application task for the backup request, the configuration file defining a minimum set of operations for the application task implemented by the first plugin;
  wherein the agent identifies the first plugin and the application task from a request by the backup server to the computing device, and generates an instruction call to execute the first plugin;
  wherein upon execution of the application task by the first plugin, the first plugin indicates a status of the application task in the common data portion of an output generated by the first plugin for the agent;
  wherein the agent utilizes the output for generating a response for the backup server in a format different from a format used by the first plugin to generate the output, the response indicating the status to the backup server; and execute by the storage system, a storage task for the backup request based on an instruction generated by the backup server after receiving the response from the agent.

16. The system of claim 15, wherein the configuration file stores a set of parameters corresponding to key-value pairs that define a plurality of options for the application task.

17. The system of claim 15, wherein the minimum set of operations includes a quiesce and an unquiesce operation.

18. The system of claim 15, wherein the agent parses the output from the first plugin and returns a result object to the backup server with the status of the application task via an application programming interface.

19. The system of claim 15, wherein the instruction is an operating system call for an operating system of the computing device that executes a runtime environment for executing the first plugin in a new process.

20. The system of claim 15, wherein in addition to the status in the common data portion, the output from the first plugin includes data that is unique to a specific method executed by the first plugin for the application task.

* * * * *